No. 776,985. PATENTED DEC. 6, 1904.
F. G. BARBOSA.
COMBINATIONAL TELEGRAPH INSTRUMENT.
APPLICATION FILED DEC. 18, 1903.
NO MODEL. 5 SHEETS—SHEET 1.

WITNESSES:
A. R. Appleman
Walton Harrison

INVENTOR
Francisco Gonzaléz Barbosa
BY
ATTORNEYS

No. 776,985. PATENTED DEC. 6, 1904.
F. G. BARBOSA.
COMBINATIONAL TELEGRAPH INSTRUMENT.
APPLICATION FILED DEC. 18, 1903.
NO MODEL. 5 SHEETS—SHEET 2.

WITNESSES:
A. R. Appleman
Walton Harrison

INVENTOR
Francisco González Barbosa
BY
ATTORNEYS

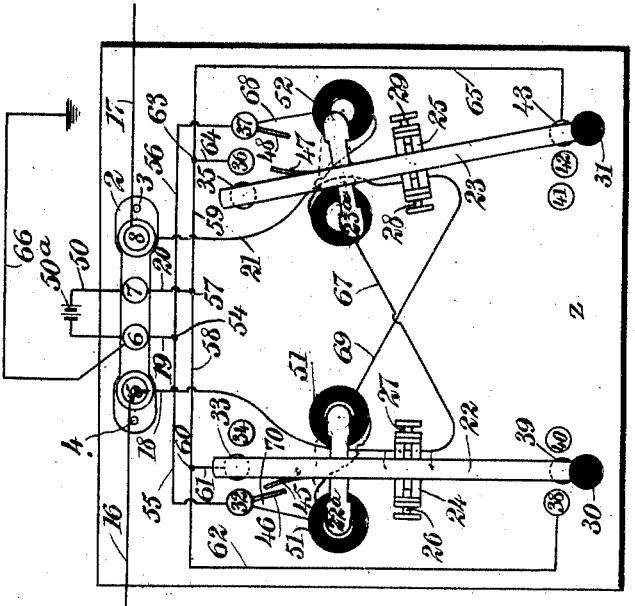

No. 776,985. PATENTED DEC. 6, 1904.
F. G. BARBOSA.
COMBINATIONAL TELEGRAPH INSTRUMENT.
APPLICATION FILED DEC. 18, 1903.
NO MODEL. 5 SHEETS—SHEET 4.
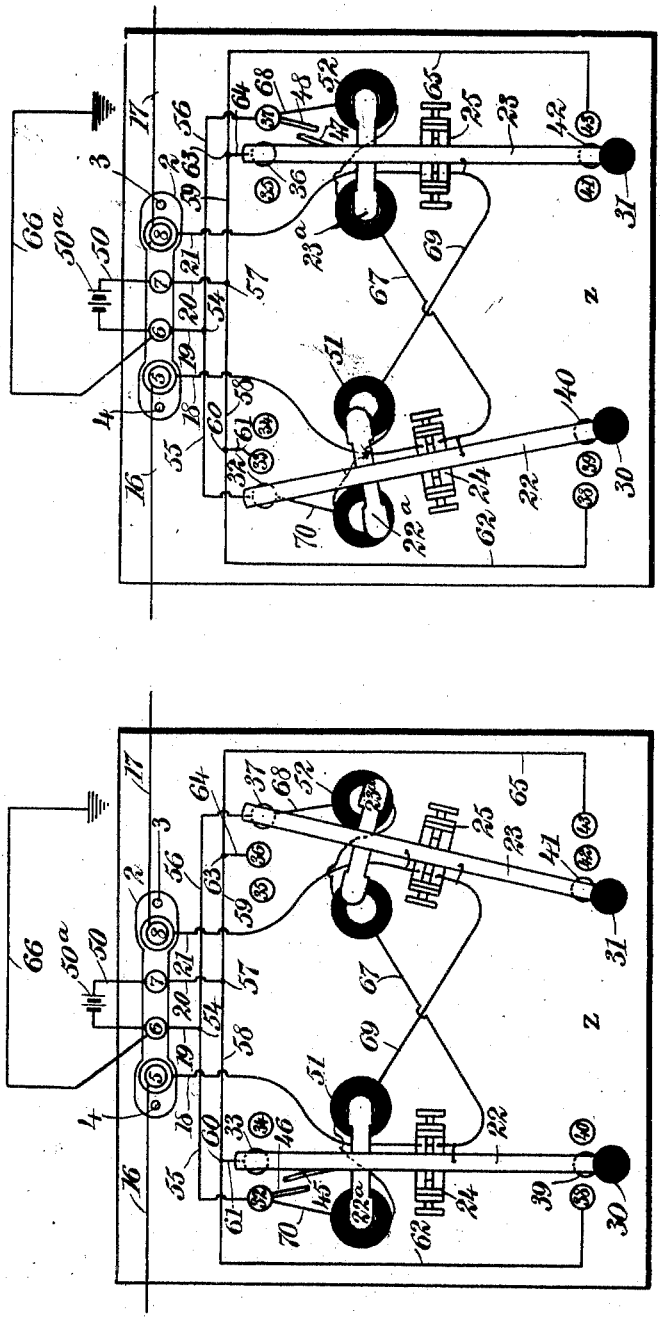
WITNESSES:
INVENTOR
Francisco González Barbosa
BY
ATTORNEYS

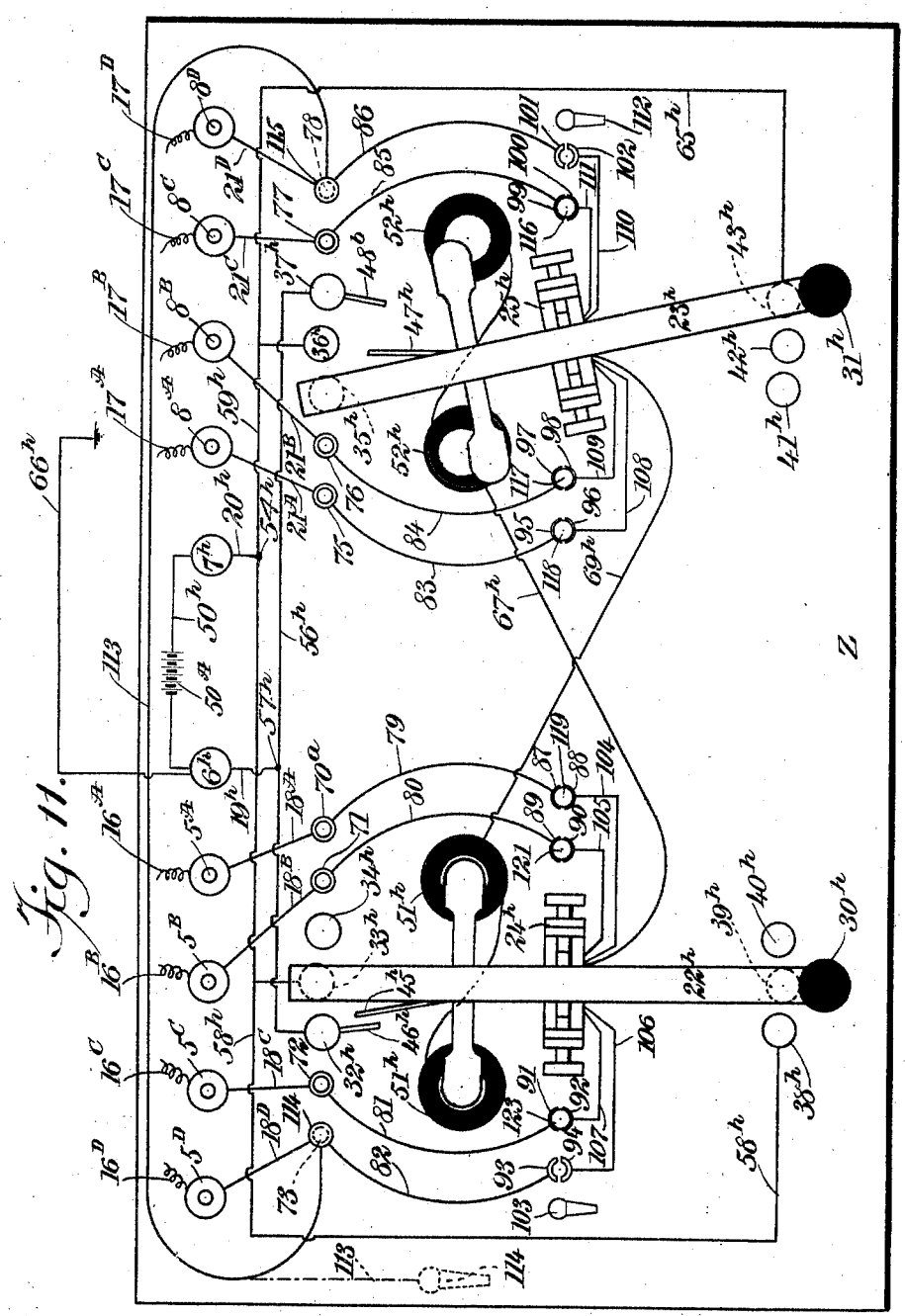

No. 776,985. Patented December 6, 1904.

UNITED STATES PATENT OFFICE.

FRANCISCO GONZÁLEZ BARBOSA, OF LIMON, COSTA RICA.

COMBINATIONAL TELEGRAPH INSTRUMENT.

SPECIFICATION forming part of Letters Patent No. 776,985, dated December 6, 1904.

Application filed December 18, 1903. Serial No. 185,650. (No model.)

*To all whom it may concern:*

Be it known that I, FRANCISCO GONZÁLEZ BARBOSA, a citizen of the Republic of Colombia, and a resident of Limon, Costa Rica, have invented a new and Improved Combinational Telegraph Instrument, of which the following is a full, clear, and exact description.

My invention relates to communication by wire, and more particularly to the production of a combinational instrument which may be used at will as a key, a sounder, a repeater, or a commutator.

My invention further relates to a system of wiring whereby this instrument may be connected for use in various relations hereinafter pointed out.

Reference is to be had to the accompanying drawings, forming a part of this specification, in which similar characters of reference indicate corresponding parts in all the figures.

Figure 1:
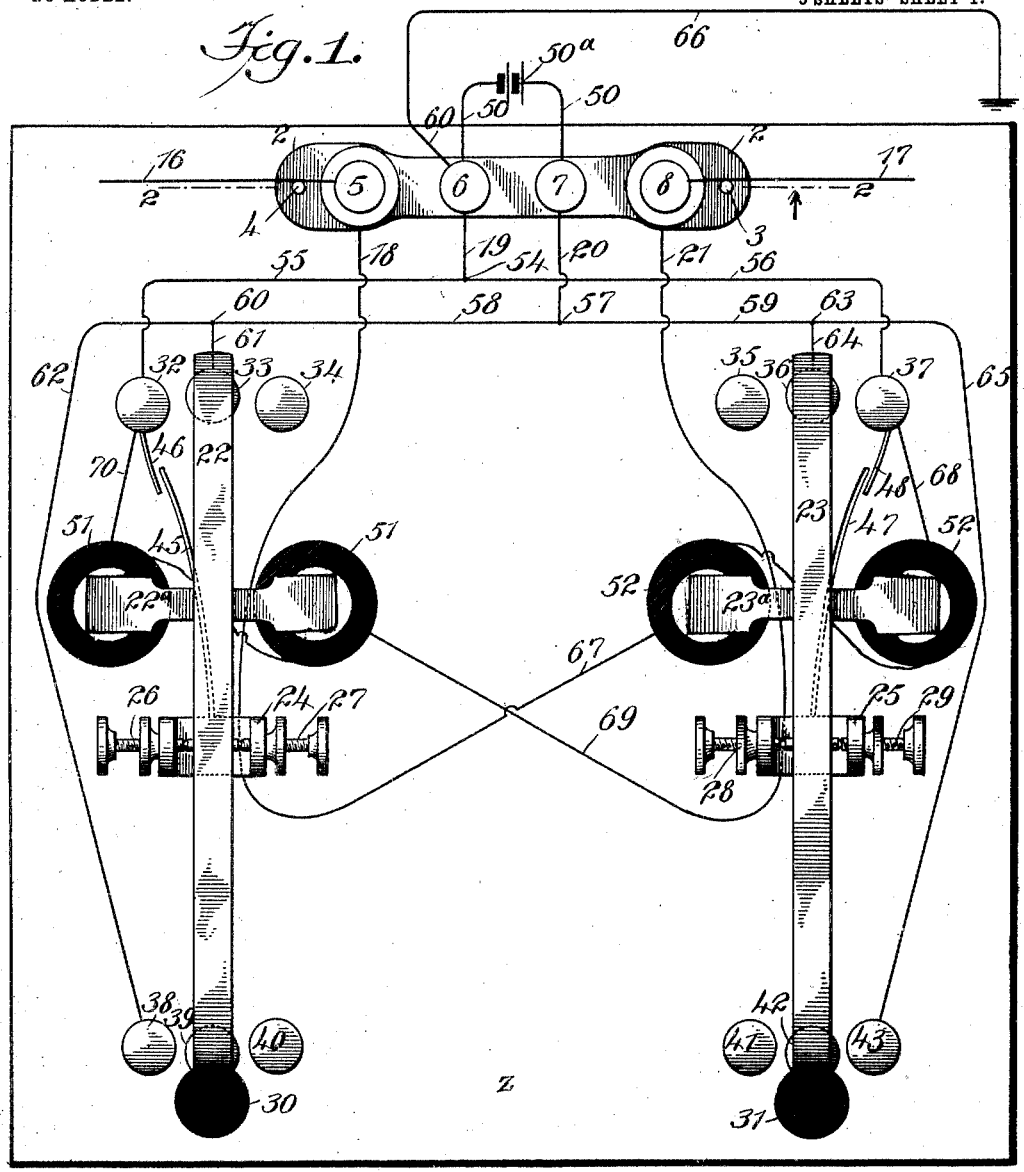
Figure 2:
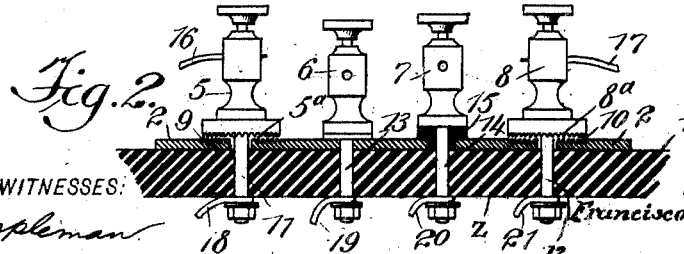
Figure 8:
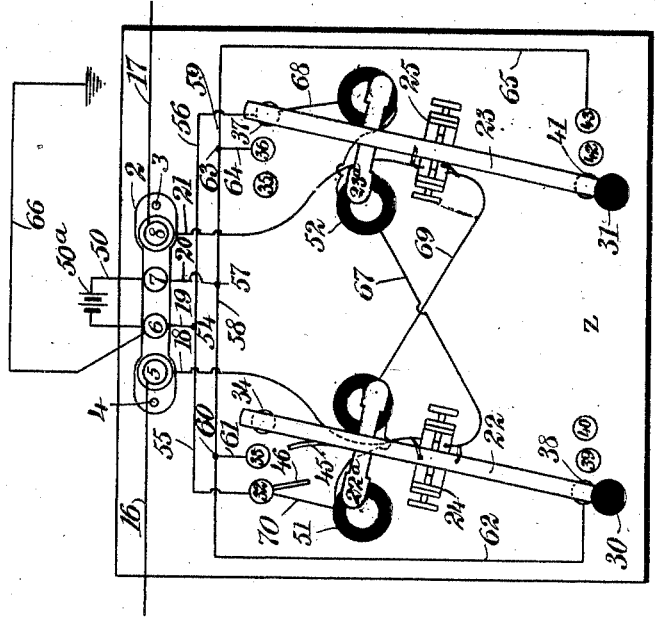
Figure 7:
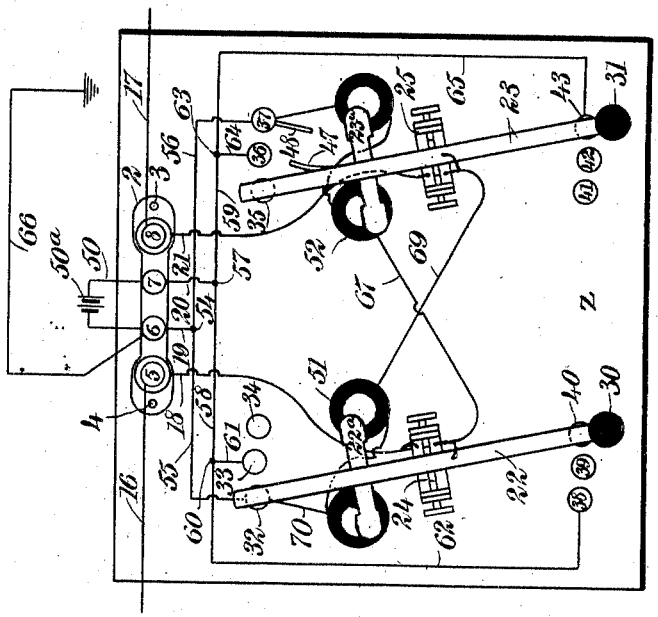
Figure 3:
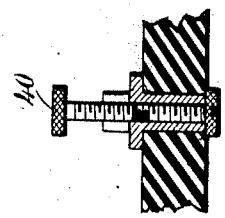

Figure 1 is a plan view showing my combinational telegraph instrument in use as an automatic repeater for two adjoining lines, but free to repeat messages in both directions. Fig. 2 is a vertical central section upon the line 2 2 of Fig. 1 looking in the direction of the arrow. Fig. 3 is a fragmentary elevation showing the details of one of the revoluble screw-stops employed in adjusting or graduating the armature-levers. Fig. 4 is a fragmentary elevation showing the type of bearing upon which each of the armature-levers is mounted so as to turn to different angles. Fig. 5 is a diagrammatic plan view showing the armature-lever 23 in position for transmitting directly to the line 17 and indirectly to the line 16. Fig. 6 is a diagrammatic plan view showing the armature-lever 22 used as a key for transmitting directly to the line 16 and indirectly to the line 17. Fig. 7 is a diagrammatic plan view showing the armature 23 in position for use as a key-lever for the purpose of transmitting messages to the line 17 to the exclusion of line 16. Fig. 8 is a diagrammatic plan view showing the armature-lever 22 in use as a key for transmitting messages to the line 16 to the exclusion of line 17. Fig. 9 is a diagrammatic plan view showing the position of the two armature-levers when the lever 23, acted upon by the magnet 51, serves as an armature for receiving communications from the line 16 to the exclusion of the line 17. Fig. 10 is a diagrammatic plan view showing the lever 22 in position for receiving messages from the line 17 to the exclusion of the line 16, and Fig. 11 is a diagrammatic plan view of the combinational instrument as used in a central office.

Upon a base $z$, of wood or other insulating material, is mounted a metallic plate 2, provided with screw-holes 3 4, whereby the plate may be firmly secured upon the base. Binding-posts 5 6 7 8 are mounted in the position indicated in Figs. 1 and 2. The binding-posts 5 and 8 are each provided with a series of concentric circular depressions $5^a$ $8^a$, analogous to the teeth of a lightning-arrester. Similar concentric circular depressions 9 10 are provided upon the plate 2 and placed in juxtaposition to those upon the binding-posts, as indicated more particularly in Fig. 2. The binding-posts are secured in position by means of stems 11, 12, 13, and 14. The post 7 is encircled by a collar 15, of insulating material, being thereby kept out of electrical communication with the plate 2. Wires 16 and 17 represent the two lines extending in opposite directions, from either of which a message may be received or repeated to the other line at will. Wires 18 19 20 21 are connected with the respective stems of the binding-posts, as indicated in Fig. 2. Levers 22 23, provided with armatures $22^a$ $23^a$, are mounted within appropriate journals 24 25, these journals being revoluble, so that the armature-levers may assume different angles. Screws 26 27 28 29 are of the type ordinarily provided for telegraphic keys and sounders. Finger-buttons 30 31 are mounted upon the outer ends of the armature-levers 22 23, so that these levers may be manipulated by hand after the manner of ordinary telegraphic keys. A number of limiting-stops 32 33 34 35 36 37 38 39 40 41 42 43 are provided for the purpose of receiving the impact of the armature-levers, divers of these limiting-stops being provided with circuit connections, as hereinafter described.

Rigidly connected with the journals 24 25 are spring-contacts 45 47, these contacts being free to move into engagement with stationary spring-contacts 46 48 when the armature-levers 22 23 are moved in proper direction to accomplish this purpose. The spring-contacts 45 46 are brought into engagement when the button 30 is moved to the right, and the contacts 47 48 engage when the button 31 is moved toward the left.

A battery 50ª is connected by wires 50 with the binding-posts 6 and 7. Magnets 51 52 are used for attracting the respective armatures 22ª 23ª when energized by the current, as hereinafter described. The wire 19 leads from the binding-post 6 to a junction 54, whence a wire 55 runs to the screw-stop 32, and a wire 56 leads from the junction 54 to the screw-stop 37. The binding-post 7 is connected by the wire 20 with a junction 57, from which a wire 58 leads to a junction 60. From this junction 60 a wire 61 leads to the stop 33 and a wire 62 leads to the stop 38. A wire 59 runs from the junction 57 to a junction 63, and thence a short wire 64 runs to the stop 36. From the junction 63 another wire, 65, runs to the stop 43. A ground-wire 66 is connected with the binding-post 6, so that the negative pole of the battery 50ª is permanently grounded. From the stop 37 a wire 68 leads to the magnet 52, whence a wire 67 leads to the journal 24, being thereby in communication with the lever 22. A wire 69 is connected with the journal 25 and the magnet 51. From this magnet a wire 70 runs to the stop 32. The wires 18 and 21 are connected with the respective journals 24 and 25.

The lines 16 and 17 may be either operated with the so-called "open" circuit or the so-called "closed" circuit, or either of the lines may be opened and the other closed.

It sometimes happens that in one section of a country the telegraphs used are of the open-circuit type, whereas in another section of the country to which said messages are to be repeated or from which they are to be repeated the lines are of the closed-circuit type. In using my repeater it makes little or no difference whether the lines 16 and 17 use the same or different systems, as the instrument operates practically the same way for either or both systems.

Referring to Fig. 1, the arrangement is shown whereby the instrument is used as a repeater from the line 16 to the line 17 or from the line 17 to the line 16. The two armature-levers 22 23 are in proper position for the instrument to work as a repeater. Supposing that a message is to be repeated from the line 16 to the line 17, the circuit is as follows: line 16, binding-post 5, wire 18, journal 24, wire 67, magnet 52, wire 68, screw-stop 37, wire 56, junction 54, wire 19, binding-post 6 to ground-wire 66. This energizes the magnet 52, but has no effect upon the magnet 51. The magnet 52 attracts the armature 23ª, thereby completing the following circuit: ground-wire 66, binding-post 6, battery 50ª, wire 50, binding-post 7, wire 20, junction 57, wire 64, lever 23, (while depressed by magnet 52,) journal 28, wire 21, and binding-post 8 to line 17.

If a message is to be repeated from line 17 to line 16, the circuits are as follows: line 17, binding-post 8, wire 21, journal 25, wire 69, magnet 51, wire 70, screw-stop 32, wire 55, junction 54, wire 19, and binding-post 6 to ground-wire 66. The magnet 51 being thus energized attracts the armature 22ª, thereby completing the following circuit: ground-wire 66, binding-post 6, battery 50ª, binding-post 7, wire 20, junction 57, wire 58, junction 60, wire 61, stop 33, lever 22, wire 18, binding-post 5 to line 16. It will thus be seen that when the armature-levers are in the position indicated in Fig. 1 either line 16 or 17 repeats upon the other automatically.

In Fig. 5 the lever 23 is shifted to the right. This leaves the apparatus in position for the operator at the junction-station to transmit upon both lines 16 and 17—that is to say, if the operator desires to transmit upon both lines he can do so by moving the lever 23 to the right, the lever 22 remaining upon the stop 33. It will be understood that the front ends of the levers 22 23—that is to say, the ends provided with finger-buttons 30 31—are made heavy enough to keep the ends nearest the operator in contact with some one of the stops 38, 39, 40, 41, 42, and 43. This is for the purpose of enabling the magnets 51 and 52 to attract the armatures 22ª 23ª. The armature-levers 22 23 are not provided with springs, but are raised upward by the fingers merely lifting the buttons 30 31. Supposing now that the operator desires to transmit messages simultaneously upon the lines 16 and 17 and that for this purpose the several parts are in the positions indicated in Fig. 5, the operator grasps the button 31, raises the end of the armature-lever, and knocks the lever upon the stop 43, which now serves as a contact, the stop 35 merely acting as an anvil, the two circuits completed being as follows: ground-wire 66, binding-post 6, battery 50ª, binding-post 7, wire 20 to junction 57. Here the circuit divides, a part going through the wire 65, stop 43, (now serving as a contact,) lever 23 to journal 25. This current now divides, a part going through wire 21 and binding-post 8 directly to line 17 and a part going from the journal 25, through the wire 69, magnet 51, wire 70, stop 32, wire 55, junction 54, wire 19, to ground-wire 66. This energizes the magnet 51, thereby depressing the rear end of the lever 22 and completing the circuit from the junction 57, where the current divides, as above explained, the divided or shunted current pursuing the following course: junction 57, stop 33, (now serving as a contact,) lever 22, (while depressed by the magnet 51,) journal 24, wire 18 to line 16. It will thus be observed that the operator has no trouble in sending messages simultaneously upon the lines 16 and 17. If desired, instead of moving the button 31 to the right, as indicated in Fig. 5, the operator may move the button 30 to the left, as indicated in Fig. 6. Thus by manipulating the button 30 he can send upon both of the lines 16 and 17, the circuits being very much like those just described, the only difference being that in this instance the magnet energized is the one numbered 52 instead of 51. As the two levers 23 and 22 are exactly alike, but move in reverse direction, and as all of the connections for the levers are practically identical, it is not necessary to trace the circuits in Fig. 6.

In Fig. 7 both buttons 30 and 31 are moved to the right. This leaves the apparatus in such condition as will enable the operator at the junction-station shown in the figure to transmit messages to the line 17 without disturbing the line 16 or interfering in any manner with messages being sent thereover from other sources. In order to thus transmit messages upon the line 17, the manipulation of the lever 23 affects the line 17 through the following circuit: ground-wire 66, binding-post 6, battery 50$^a$, binding-post 7, wire 20, junction 57, wire 59, junction 63, wire 65, stop 43, (now serving as a contact,) lever 23 to journal 25, whence the circuit divides, a part going through wire 21 to line 17 and a part going through the wire 69, magnet 51, wire 70, stop 32, wire 55, wire 19, and binding-post 6 to ground-wire 66. Each depression of the lever 23 therefore completes the circuit of the main line 17 and also energizes the magnet 51, causing it to attract the armature 22$^a$, so as to depress the rear end of the lever 22. It will be noted, however, that this depression of the rear end of the lever 22 does not affect the circuit of the line 16, for the reason that the spring-contacts 45 and 46 are now in engagement and the circuit from the line 16 is always closed, as follows: line 16, binding-post 5, wire 18, journal 24, spring-contacts 45 46, stop 32, wire 55, wire 19, binding-post 6 to ground-wire 66. The energizing and deënergizing of the magnet 51, therefore, merely has the effect of causing the lever 22 to beat mechanically upon the stops 32 and 40, thus virtually acting as a sounder for the line 17 and being totally inert as regards any electrical action upon the line 16.

In Fig. 8 the lever 22 is in position for transmitting to the line 16, the lever 23 being arranged so as to serve as a sounder for the line 16 and being totally inert as regards the line 17. In this instance the circuits are as follows: ground-wire 66, battery 50$^a$, wire 20, wires 58 and 62, stop 38, lever 22, journal 24, wire 18, binding-post 5, to line 16. From the journal 24, forming a part of the circuit just described, a portion of the current divides off and passes through wire 67, magnet 52, wire 68, stop 37, wire 56, wire 19, and binding-post 6 back to ground-wire 66. The portion of the current passing through the magnet 52 depresses the rear end of the lever 23 and causes the same to knock upon the stop 37 and when released to drop upon the stop 41. This action of the lever 23 is purely mechanical, however, for the reason that the spring-contact members 47 48 are in engagement so long as the armature 23 occupies the general position indicated in this figure. The line 17 is therefore connected, by means of the wire 21, spring-contacts 47 48, wires 56 and 19, with the binding-post 6, which is connected with the ground-wire 66. It will thus be seen that the lever 23 merely operates as the armature of a sounder acting on motions of the lever 23, used as a key, and that the line 17 is grounded regardless of whether the lever 23 is depressed or not. In other words, the operator may use either of the levers 22 or 23 as a key, the remaining lever serving as a sounder, and the messages are limited to either line accordingly as the armature-levers may occupy the position indicated in Fig. 7 or that indicated in Fig. 8.

In Fig. 9 the apparatus is arranged for use as an ordinary receiver for taking messages from the line 16, all communication with the line 17 being cut off without disturbing messages otherwise being transmitted upon the line 16. For this purpose the button 31 is moved to the left, so as to be over the stop 41, the button 30 remaining in the middle over the stop 39. When in this position, the circuits are as follows: line 16, binding-post 5, wire 18, journal 24, wire 67, magnet 52, wire 68, stop 37, wire 56, junction 54, wire 19, binding-post 6, to ground-wire 66. The line is thus grounded through the magnet 52, so that the impulses coming over the line 16 cause the armature 23$^a$ to depress the lever 23, causing the same to knock upon the stop 37. The spring-contacts 47 48 being closed by the general position of the lever 23, the circuit from line 17 is as follows: line 17, binding-post 8, wire 21, journal 25, spring-contacts 47 48, stop 37, wire 56, junction 54, wire 19, binding-post 6, to ground-wire 66. The vertical movements of the lever 23 therefore have no effect upon the line 17 for the reason that the spring-contacts 47 48 being closed the line 17 remains grounded.

In Fig. 10 the apparatus is shown in the position for receiving messages from the line 17, all communication with the line 16 being excluded and messages being free to pass from other stations over the line 16 without being interfered with from this station. The circuits described in this figure will readily be understood from those already described with reference to Fig. 9. The finger-button 30 being moved to the right, so as to close the spring-contacts 45 46, the circuits are as follows: line 17, binding-post 8, wire 21, journal 25, wire 69, magnet 51, wire 70, stop 32, wire 55, junction 54, wire 19, binding-post 6, back to ground-wire 66. This energizes the magnet 51, causing the lever 22 and armature 22ᵃ to act as a sounder for the line 17. The line 16 is grounded, so as not to interfere with messages passing thereover, the circuit being as follows: line 16, binding-post 5, wire 18, journal 24, spring-contacts 45 46, (now in engagement,) stop 32, wire 55, junction 54, wire 19, binding-post 6, to ground-wire 66.

From Figs. 6 and 7 it will be seen that while merely shifting the buttons 30 31, as indicated, the apparatus may be used as a receiver for either of the lines 16 or 17, and in so doing it does not interfere in the slightest with messages going over the line.

By tracing the receiver-circuits above described it will be seen that it matters not whether the lines 16 17, or either of them, be operated by means of closed or open circuits. In fact, the entire system will operate with no other battery than that shown at 50ᵃ, and it makes comparatively little difference whether or not batteries are used upon the lines 16 17 or whether these lines be controlled by open or closed circuits, as the case may be. Hence the apparatus may be used for repeating from a closed line to an open line or from an open line to a closed line, from an open line to an open line, or from a closed line to a closed line, the working of the apparatus being, in fact, entirely independent of the nature of the batteries employed upon either or both lines.

The screw-stops, numbered 32 to 43, inclusive, are provided with milled heads, as shown, and by rotation of the fingers may be adjusted to any desired degree of height. These screw-stops are all the mechanism necessary for limiting the play of the levers 22 23 for all of the purposes above enumerated and for forming the several anvil and electrical contacts when the levers are used in their various capacities as sounder-levers, key-levers, repeater-levers, commutators.

Incidentally when the apparatus works as a repeater from one line to the other it also serves as a sounder at the junction-station, so that the operator at that station is enabled to hear messages going from one line to the other.

In the combinational instrument as used at the central office (see Fig. 11) the arrangement of the several parts is substantially the same as above described, with the exception that additional provision is made for substituting any one or all of a plurality of lines for the line 16 and also for substituting one or all of a plurality of lines for the line 17.

Upon the base Z are mounted the key-levers 22ʰ 23ʰ, these levers being provided with contact-anvils 38ʰ, 39ʰ, 40ʰ, 41ʰ, 42ʰ, and 43ʰ. The levers 22ʰ are also provided with finger-buttons 30ʰ 31ʰ. At the rear of the levers are the rear contact members 32ʰ, 33ʰ, 34ʰ, 35ʰ, 36ʰ, and 37ʰ, all of these parts being similar to the corresponding parts above described. The contact-springs 45ʰ 46ʰ 47ʰ 48ʰ and the revoluble posts 24ʰ 25ʰ are identical likewise to the parts above described, the base Z supporting the several parts. The battery 50ᴬ, wires 58ʰ, 59ʰ, 56ʰ, 58ʰ, 65ʰ, 50ʰ, 19ʰ, and 20ʰ and the contacts 6ʰ 7ʰ and the junctions 54ʰ and 57ʰ are arranged as in the wiring already described and are identical with the electrical connections shown in the other figures. Instead, however, of lines 16 17 engaging the respective posts 5 8, as shown in the other figures, I connect a number of outgoing wires 16ᴬ, 16ᴮ, 16ᶜ, and 16ᴰ with the respective posts 5ᴬ, 5ᴮ, 5ᶜ, and 5ᴰ, and from these posts I run wires 18ᴬ, 18ᴮ, 18ᶜ, and 18ᴰ to the tubular sockets 70ᵃ, 71, 72, and 73. Similarly, I connect the wires 17ᴬ, 17ᴮ, 17ᶜ, and 17ᴰ with the respective binding-posts 8ᴬ, 8ᴮ, 8ᶜ, and 8ᴰ, and from these binding-posts I run wires 21ᴬ, 21ᴮ, 21ᶜ, and 21ᴰ to the respective contact-sockets 75, 76, 77, and 78. The tubular sockets 70ᵃ, 71, 72, and 73 are connected by wires 79, 80, 81, and 82 with the respective contact members 87, 89, 91, and 93, which are respectively paired with the contact members 88, 90, 92, and 94, each of these contact members being semicylindrical and adapted to be closed by the insertion of a metallic peg. Similarly, the contact members 95, 97, 99, and 101 are respectively disposed opposite the contact members 96, 98, 100, and 102. Contact-pegs for engaging the sockets thus formed are shown at 103 and 112. The contact members 88, 90, 92, and 94 are connected by wires 104, 105, 106, and 107 with the revoluble post 24ʰ, and similarly the contact members 96, 98, 100, and 102 are respectively connected by wires 108, 109, 110, and 111 with the revoluble post 25ʰ.

A flexible cord 113 is provided at its respective ends with metallic plugs 114 and 115, and these plugs may be inserted in the tubular contact members 73 78, as indicated at the extreme left and extreme right in Fig. 11. By means of these plugs and the flexible cord 113 any of the lines may be connected with any of the other lines. For instance, as shown in Fig. 11, the line 5ᴰ is directly connected with the line 18ᴰ, so that the instrument shown in Fig. 11 is not affected at all, these lines communicating with each other directly. Of course by inserting the plugs 114 115 in the appropriate tubular contacts 70ᵃ, 71, 72, 73, 74, 75, 76, 77, and 78 any two of the lines may be placed in direct communication without disturbing the combinational instrument at the central station. Any number of the plugs 103 and 112 may be provided. By inserting a number of these plugs 116, 117, 118, 119, 121, and 123 various changes may be made in the wiring.

It is obvious, for instance, that any one of the wires 5ᴬ 5ᴮ 5ᶜ 5ᴰ may be connected with the revoluble member 24ʰ and made to perform the function of the wire 16 in Fig. 1. It is also obvious that any one of the lines $8^A$, $8^B$, $8^C$, and $8^D$ may be connected with the revoluble post $25^h$, and thus made to perform the office of the line 17. (Shown in Fig. 1.) By inserting any number of these plugs, as shown, the central office can be placed in communication with the corresponding number of the lines, so as to transmit to them all at once. For instance, as shown at the left of Fig. 11, the plugs 119, 121, and 123 being inserted, as shown, the central office is in condition to transmit to the lines $5^A$, $5^B$, and $5^C$. For this purpose the key-lever $23^h$ is moved into the position shown in full lines in Fig. 11, this position corresponding to the position of the lever 23 in Fig. 5.

The action of the apparatus and the courses of the several circuits are identical with those described with reference to Fig. 5, with the exception that instead of the current leaving the turning-post 24 and passing out through the line 16, as shown in Fig. 5, it leaves the turning-post $24^h$ and passes out upon the lines $16^A$, $16^B$, and $16^C$. Similarly, the key $22^h$ may be moved to the left or into the position indicated by the lever 22 in Fig. 6, and thus the central office is enabled to communicate directly with the lines $17^A$, $17^B$, $17^C$, and $17^D$, this action being analogous to that described with reference to Fig. 6. The only difference is that instead of being in communication with the line 17 shown in that figure the operator is in communication with the three lines just mentioned—that is to say, the circuits are practically the same as those described with reference to Fig. 6, the only difference being that the circuit is divided and sent upon a plurality of lines instead of being sent upon the single line 17. In short, as the combinational instrument shown in Fig. 7 is a duplicate of the combinational instrument shown in the other figures, with the exception that the connections from the revoluble posts $24^h$ $25^h$ to the lines are multiplied, the number of lines being increased accordingly, it follows that anything which can be done with the instruments shown in Figs. 1 to 10, inclusive, may be done with the instrument shown in Fig. 11, and that, if desired, the effect may be duplicated upon a plurality of lines rather than upon a single line.

Having thus described my invention, I claim as new and desire to secure by Letters Patent—

1. In a combinational telegraph instrument, the combination of a lever mounted upon a journal and free to swing laterally and also to rock in an independent plane, stops disposed below said lever and adapted to be engaged thereby, and contact members controllable by lateral movements of said lever, said contact members being closed when said lever is moved laterally in one direction and opened when said lever is moved laterally in another direction.

2. In a combinational telegraph instrument, the combination of a pair of magnets, armature-levers journaled adjacent thereto and free to swing horizontally and also to rock vertically, means for energizing said magnets independently of each other, contacts connected with said levers and free to open and close by lateral movements thereof, and means for actuating said armature-levers by hand independently of the action of said magnets.

3. In a combinational telegraph instrument, the combination of armature-levers, magnetic mechanism for controlling the same automatically, finger mechanism for actuating said levers at will, and means for mounting said levers so as to allow the same to swing in a direction independent of the normal movements thereof, whereby the apparatus may be used as keys, sounders, repeaters, or commutators.

In testimony whereof I have signed my name to this specification in the presence of two subscribing witnesses.

FRANCISCO GONZÁLEZ BARBOSA.

Witnesses:
PIERRE PAUL DEMERS,
F. PERCY SCOTT.